(12) United States Patent
Ito (10) Patent No.: US 7,555,958 B2
(45) Date of Patent: Jul. 7, 2009

(54) PHYSICAL QUANTITY DETECTOR

(75) Inventor: Hajime Ito, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 11/723,773

(22) Filed: Mar. 22, 2007

(65) Prior Publication Data
US 2007/0222193 A1 Sep. 27, 2007

(30) Foreign Application Priority Data
Mar. 24, 2006 (JP) ............................... 2006-083233

(51) Int. Cl.
*G01L 9/04* (2006.01)
*G01R 1/30* (2006.01)
(52) U.S. Cl. ........................................ 73/720; 324/124
(58) Field of Classification Search ........... 73/700–756; 361/283.1–283.4; 324/122–126
See application file for complete search history.

(56) References Cited

U.S. PATENT DOCUMENTS

| | | | | |
|---|---|---|---|---|
| 3,358,511 A | * | 12/1967 | Bargen | 73/727 |
| 4,165,653 A | * | 8/1979 | Morehouse | 73/722 |
| 4,449,409 A | * | 5/1984 | Antonazzi | 73/724 |
| 4,546,651 A | * | 10/1985 | Merrick | 73/701 |
| 4,951,236 A | * | 8/1990 | Kawate et al. | 702/98 |
| 5,974,892 A | | 11/1999 | Swart et al. | |
| 6,104,235 A | * | 8/2000 | Monti et al. | 327/554 |
| 6,894,558 B2 | * | 5/2005 | Behzad | 327/559 |
| 6,967,529 B2 | * | 11/2005 | Behzad | 330/51 |
| 7,102,428 B2 | * | 9/2006 | Behzad | 330/51 |

FOREIGN PATENT DOCUMENTS

JP   A-05-066228   3/1993

\* cited by examiner

*Primary Examiner*—Andre J Allen
*Assistant Examiner*—Jermaine Jenkins
(74) *Attorney, Agent, or Firm*—Posz Law Group, PLC (57) ABSTRACT

A physical quantity detector includes a pressure-responsive bridge circuit that outputs a detection voltage including a voltage component corresponding to atmospheric pressure and a voltage component corresponding to a change quantity from the atmospheric pressure, a filter that eliminates the voltage component corresponding to the change quantity from the atmospheric pressure, and a variable gain unit that amplifies a voltage difference between the detection voltage outputted from the bridge circuit and the filter output voltage that is free form the change quantity from the atmospheric pressure.

3 Claims, 6 Drawing Sheets

PHYSICAL QUANTITY DETECTOR

CROSS REFERENCE TO RELATED APPLICATION

This application is based on and incorporates herein by reference Japanese Patent Application No. 2006-083233 filed on Mar. 24, 2006.

FIELD OF THE INVENTION

The present invention relates to a physical quantity detector that detects a physical quantity. For example, the physical quantity detector may be suitably used for a side collision detector that detects collision against a vehicle door by detecting pressure changes inside the vehicle door.

BACKGROUND OF THE INVENTION

Some conventional physical quantity detectors detect pressure changes within a vehicle door by plural acoustic microphones and detect collision against a vehicle side based on a signal that is wave-shaped by a band pass filter (e.g., JP-5-66228A).

Moreover, other conventional detectors detect collision regardless of a change in atmospheric pressure by compensating and controlling the sensitivity of a pressure sensor that detects pressure according to a change in the atmospheric pressure (e.g., U.S. Pat. No. 5,974,892 and JP-11-500218A).

However, as described in JP-5-66228A, in an attempt to detect collision against a vehicle side by detecting an abrupt pressure change within a vehicle door, since pressure within the door is changed by not only collision but also the atmospheric pressure, detection precision of collision would vary depending on changes in the atmospheric pressure.

Figure 8:
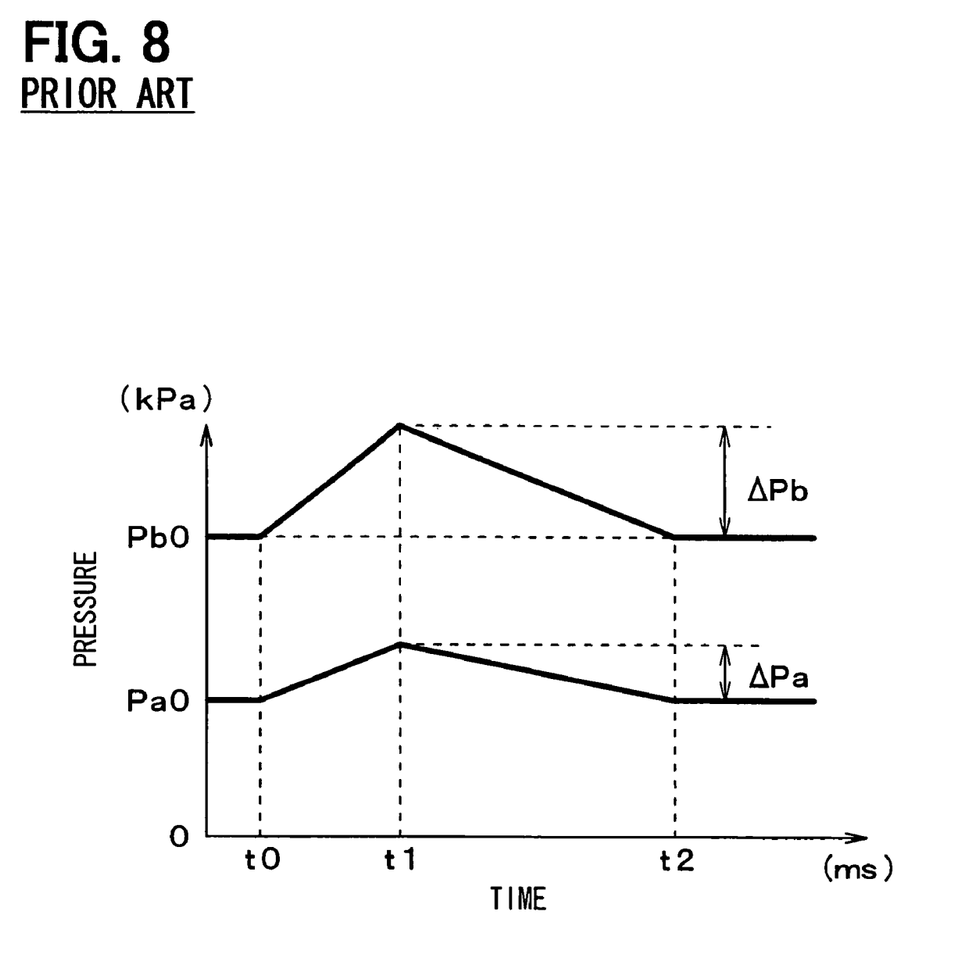
FIG. 8 is a graph showing pressure changes within a vehicle door caused by collision against the door.

FIG. 8 shows two pressure changes within a vehicle door caused by collision against the door. One represents a case where an atmosphere pressure is as high as $Pb0$, and the other presents a case where an atmosphere pressure is as low as $Pa0$. Pressure P within a vehicle door begins to rise from an atmospheric pressure before collision when the collision occurs at time $t0$, and falls back to the atmospheric pressure at time $t2$ after becoming maximum at a certain time (time $t1$). A change quantity of pressure within the door caused by the collision is smaller when the atmospheric pressure is low than when the atmospheric pressure is high. Specifically, a change quantity $\Delta Pa$ of pressure within the door in the case of atmospheric pressure $Pa0$ is smaller than a change quantity $\Delta Pb$ of pressure within the door in the case of atmospheric pressure $Pb0$.

When pressure within a vehicle door is P, an atmospheric pressure is $P0$, a pressure change caused by collision is $\Delta P$, a space volume within the door before collision is $V0$, and a space volume change caused by collision is $\Delta V$ a change $\Delta P$ of the pressure P within the door at collision is expressed by equation 1, based on the equation of state for the ideal gas.

$$\Delta P = -(\Delta V/V0) \times P0 \quad \text{[Equation 1]}$$

It will be understood from the equation 1 that a pressure change $\Delta P$ caused by collision is proportional to the atmospheric pressure $P0$. Therefore, at a high altitude, the atmospheric pressure becomes low and hence a pressure change $\Delta P$ becomes small, so that detection precision of collision decreases.

That is, the atmospheric pressure $P0$ is considered as an average physical quantity of a detection target, a pressure change $\Delta P$ from the atmospheric pressure $P0$ is considered as a change quantity from the average physical quantity, and a detection precision of a physical quantity of the detection target decreases due to a change in the average physical quantity of the detection target.

The detector disclosed in U.S. Pat. No. 5,974,892 therefore includes a circuit for compensating and controlling sensor sensitivity to reduce influence by a change in atmospheric pressure.

SUMMARY OF THE INVENTION

The present invention has an object of reducing influence of changes in an average physical quantity on the detection precision of a physical quantity of a detection target.

The present invention is based on a finding that, by using a signal indicating a ratio ($\Delta P/P0$) of a pressure change $\Delta P$ relative to an atmospheric pressure $P0$, collision against a vehicle door can be detected with a fixed detection precision without being influenced by the atmospheric pressure. Specifically, the atmospheric pressure $P0$ is assumed to be an average physical quantity of a detection target, and the pressure change $\Delta P$ relative to the atmospheric pressure $P0$ is assumed to be a change quantity from the average physical quantity. By calculating the ratio of a change quantity from the average physical quantity relative to the average physical quantity of the detection target, the influence of the average physical quantity of the detection target is eliminated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
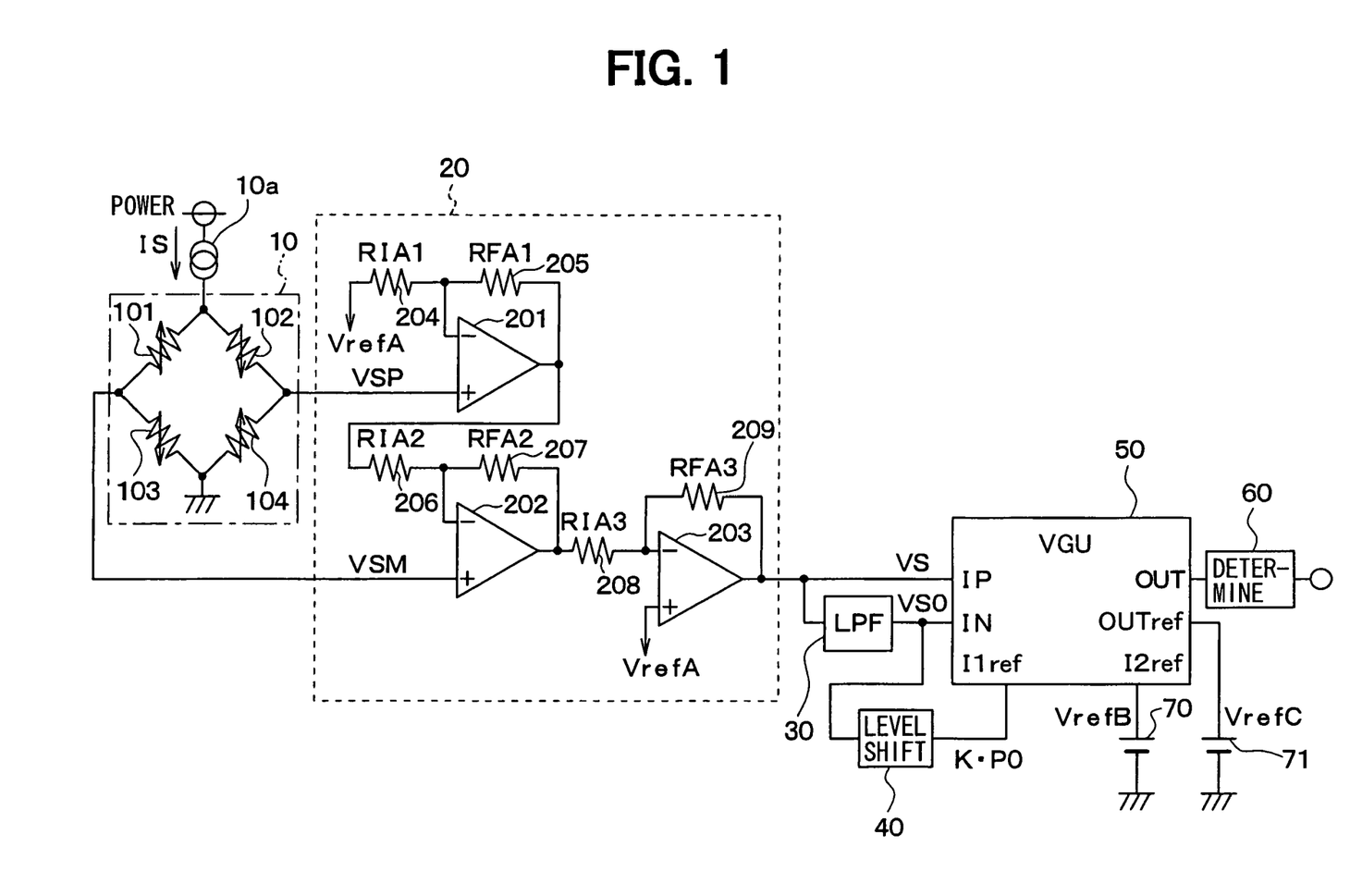
FIG. 1 is a circuit diagram of a physical quantity detector according to a first embodiment of the present invention.

A physical quantity detector shown in FIG. 1 is installed in each door of a vehicle (not shown) as a collision detector that detect collision against the door of the vehicle by detecting a change in air pressure within the door of the vehicle.

The physical quantity detector is provided with a pressure detecting part (not shown) including a thin diaphragm. Gauge resistors 101 to 104 are formed in a pressure sensitive area of the diaphragm by diffusing impurities, and a bridge circuit 10 is constituted by those resistors 101 to 104.

Of the resistors in the bridge circuit 10, the resistors 101 and 104 are formed in the periphery of a diaphragm part, and the resistors 102 and 103 are formed at a central portion of the diaphragm part. When pressure is applied to the diaphragm part, the respective resistance values of the resistors 101 to 104 change in the direction indicated by the arrow in FIG. 1 because of the piezoresistive effect. That is, the resistors 101 and 104 increase respective resistance values, and the resistors 102 and 103 decrease respective resistance values.

A constant current IS is supplied to the bridge circuit 10 from a constant current circuit 10a. With the constant current IS being supplied, the bridge circuit 10 outputs voltages VSP and VSM according to pressures applied to the diaphragm. The relationship between pressure P to the diaphragm and the voltages VSP and VSM is in a proportional relation as shown by equation 2.

$$VSP-VSM \propto P \qquad \text{[Equation 2]}$$

An amplifier 20 includes operational amplifiers 201 to 203 and resistors 204 to 209, and differentially amplifies the voltages VSP and VSM outputted from the bridge circuit 10. The operational amplifier 201 amplifies a voltage difference between the voltage VSP from the bridge circuit 10 and a reference voltage VrefAg generated by a reference potential generating circuit (not shown). Specifically, the voltage VSP from the bridge circuit 10 is applied to the non-inverting input terminal of the operational amplifier 201, and the reference voltage VrefA generated by the reference potential generating circuit is applied to the inverting input terminal via the resistor 204. A voltage produced by amplifying a voltage difference of the voltage VSP and the reference voltage VrefA is outputted from an output terminal of the operational amplifier 201.

The operational amplifier 202 amplifies a voltage difference between the voltage VSM from the bridge circuit 10 and an output voltage of the operational amplifier 201. Specifically, the voltage VSM from the bridge circuit 10 is applied to the non-inverting input terminal of the operational amplifier 202, the voltage outputted from the output terminal of the operational amplifier 201 is applied to its inverting input terminal via the resistor 206, and a voltage produced by amplifying a voltage difference between the voltage VSM from the bridge circuit 10 and the output voltage of the operational amplifier 201 is outputted from the output terminal of the operational amplifier 202. The resistors 204 and 207, and the resistors 205 and 206 respectively have an identical resistance value, and the amplification factor of the operational amplifier 201 is equal to the reciprocal of the amplification factor of the operational amplifier 202.

The operational amplifier 203 amplifies an output voltage of the operational amplifier 202. Specifically, a reference voltage VrefA generated by the reference potential generating circuit is applied to the non-inverting input terminal of the operational amplifier 203, and the output voltage of the operational amplifier 202 is applied to its inverting input terminal via a resistor 208. From the output terminal of the operational amplifier 203, the voltage produced by amplifying a voltage difference between the reference voltage VrefA and the output voltage of the operational amplifier 202, that is, a voltage VS produced by amplifying a voltage difference between the voltage VSP from the bridge circuit 10 and the voltage VPM is outputted.

When it is assumed that the respective resistance values of the resistors 206 to 209 are RIA2, RFA2, RIA3, and RFA3, the voltage VS outputted from the operational amplifier 203 is expressed by equation 3.

$$VS=(RFA3/RIA3) \times (RFA2/RIA2+1) \times (VSP-VSM)+VrefA \qquad \text{Equation [3]}$$

From these equations 2 and 3, the voltage VS is expressed by equation 4.

$$VS=K \times P+VrefA \qquad \text{[Equation 4]}$$

K designates a conversion factor from pressure to voltage. When it is assumed that the atmospheric pressure at collision is P0 and a pressure change from the atmospheric pressure P0 is ΔP, pressure P applied to the diaphragm is expressed by equation 5.

$$P=P0+\Delta P \qquad \text{[Equation 5]}$$

Therefore, the voltage VS outputted from the amplifier 20 is expressed by equation 6.

$$VS=K \times (P0+\Delta P)+VrefA \qquad \text{[Equation 6]}$$

Figure 2:
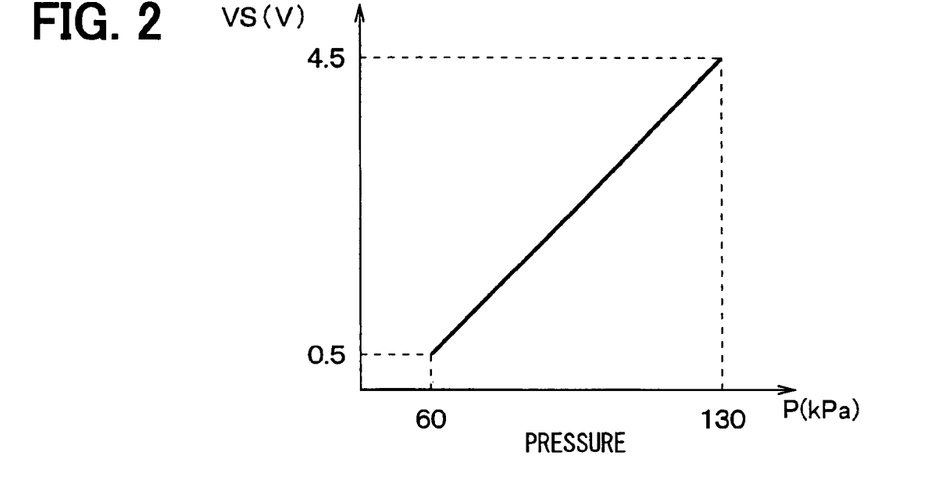
FIG. 2 is a graph showing an example of a relation between a detected pressure and an output voltage of an amplifier in the first embodiment.

FIG. 2 shows an example of characteristics of a detected pressure P detected by the diaphragm part of the bridge circuit 10 and the voltage VS outputted from the output terminal of the operational amplifier 203. As understood from FIG. 2, the voltage VS when detected pressure P is 60 kilopascals (kPa) is 0.5 volts (V), the voltage VS when detected pressure P is 130 kilopascals (kPa) is 4.5 volts (V), and the relationship between the voltage VS and the detected pressure P is linear.

Pressure within a door at collision, as shown in FIG. 8, rises to a certain value from atmospheric pressure, then falls back to the atmospheric pressure. The voltage VS outputted from the amplifier 20 also changes like pressure within the door at collision. Specifically, the voltage VS outputted from the amplifier 20 includes a voltage component (DC component) corresponding to atmospheric pressure P0 and a voltage component (AC component) corresponding to a pressure change ΔP caused by the collision.

The physical quantity detector, as shown in FIG. 1, further includes a low pass filter (LPF) 30, a level shifter 40, a variable gain unit 50, and a determination circuit 60.

Figure 3:
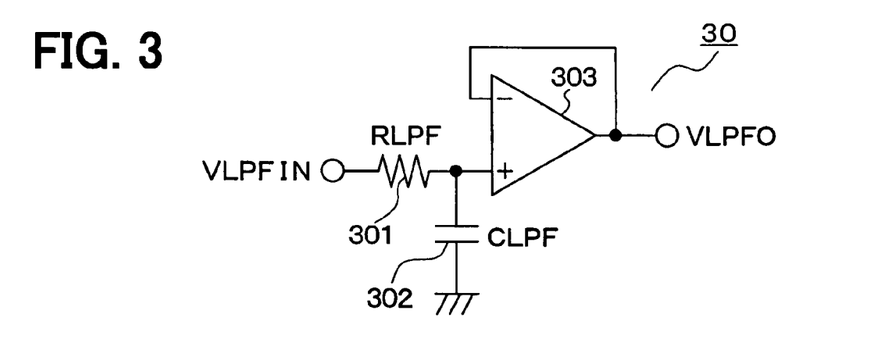
FIG. 3 is a circuit diagram of a filter in the first embodiment.

The filter 30 is shown in detail in FIG. 3. The filter 30 is provided for removing voltage components (AC components) corresponding to the pressure change ΔP caused by collision from the voltage VS outputted from the amplifier 20 and extracts a voltage component (DC component) corresponding to the atmospheric pressure P0. An input terminal VLPFIN is connected to an output terminal of the amplifier 20, and an output terminal VLPFO is connected to a terminal IN of the variable gain unit 50.

The filter 30 includes a low pass filter constituted by a resistor 301 and a capacitor 302, and an operational amplifier 303 that functions as a buffer. When it is assumed that a resistance value of the resistor 301 is RLPF, and a capacitance of the capacitor 302 is CLPF, a cutoff frequency fc of a low pass filter constituted by the resistor 301 and the capacitor 302 is expressed by equation 7.

$$fc=1/(2\pi \times RLPF \times CLPF) \qquad \text{[Equation 7]}$$

Specifically, by this low pass filter 30, a voltage produced as a result of eliminating higher frequency components (AC components) than the cutoff frequency fc shown in the equation 7, that is, a frequency component (AC component) corresponding to a pressure change ΔP from the atmospheric pressure P0 caused by collision from the voltage VS applied to the input terminal VLPFIN is applied to the non-inverting input terminal of the operational amplifier 303. The operational amplifier 303 outputs a voltage VSO corresponding to the voltage applied to the non-inverting input terminal from the output terminal VLPFO. Therefore, the voltage VS0 outputted from the output terminal VLPFO of the filter 30 is represented as a function shown by equation 8.

$$VSO = K \times P0 + VrefA \qquad \text{[Equation 8]}$$

Figure 4:
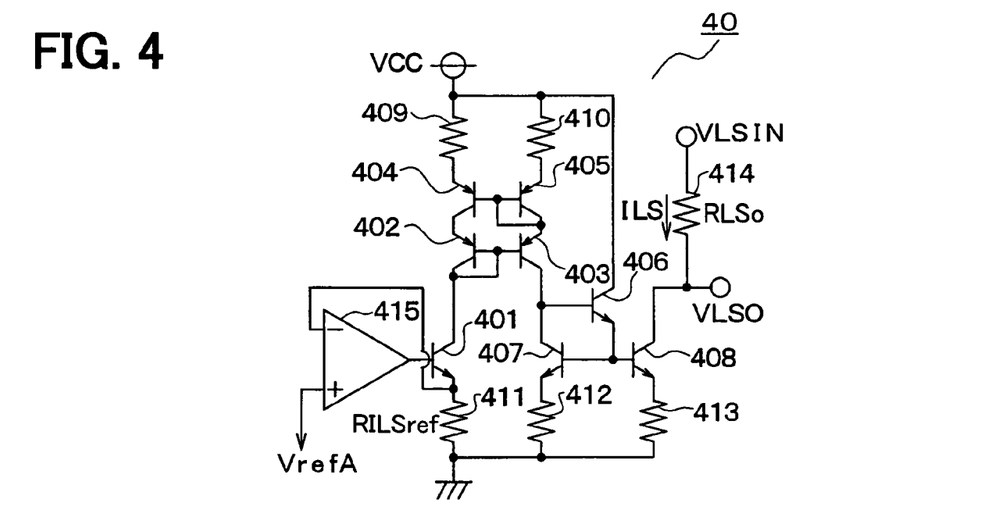
FIG. 4 is a circuit diagram of a level filter in the first embodiment.

A level shifter 40 is shown in detail in FIG. 4. It is provided to decrease the voltage VSO outputted from the filter 30 by the reference voltage VrefA of the amplifier 20. The input terminal VLSIN is connected to a terminal IN of the variable gain unit 50 together with the output terminal VLPFO of the filter 30, and the output terminal VLSO is connected with a terminal I1ref of the variable gain unit 50.

The level shifter 40 includes a first current mirror circuit that comprises PNP-type transistors 404, 402, 405, and 403, and resistors 409 and 410, a second current mirror circuit that comprises NPN-type transistors 406 to 408, and resistors 412 and 413, an operational amplifier 415 and an NPN-type transistor 401 that function as buffers, and resistors 411 and 414.

The reference voltage VrefA is applied to a non-inverting input terminal of the operational amplifier 415, and an equal current flows through each of the resistors 411 and 414 by first and second current mirror circuits.

When a resistance value of the resistor 411 is assumed as RILSref, a current ILS flowing through the resistor 414 is expressed by equation 9.

$$ILS = VrefA / RILSref \qquad \text{[Equation 9]}$$

When a resistance value of the resistor 414 is assumed as RLSo and a voltage of the input terminal VLSIN is assumed as VLSIN, a voltage VLSO of the output terminal VLSO is expressed by equation 10.

$$VLSO = VLSIN - RLSo \times ILS \qquad \text{[Equation 10]}$$

As RILSref and RLSo are set to be equal to each other, in accordance with the equations 9 and 10, the voltage VLSO of the output terminal VLSO are expressed by equation 11.

$$VLSO = VLSIN - VrefA \qquad \text{[Equation 11]}$$

Therefore, when the voltage VSO shown by the equation 8 is applied to the input terminal VLSIN of the level shifter 40, the voltage VLSO of the output terminal VLSO of the level shifter 40 is shown by equation 12.

$$VLSO = K \times P0 \qquad \text{[Equation 12]}$$

Thus, the voltage VSLO outputted from the level shifter 40 is proportional to the atmospheric pressure.

Figure 5:
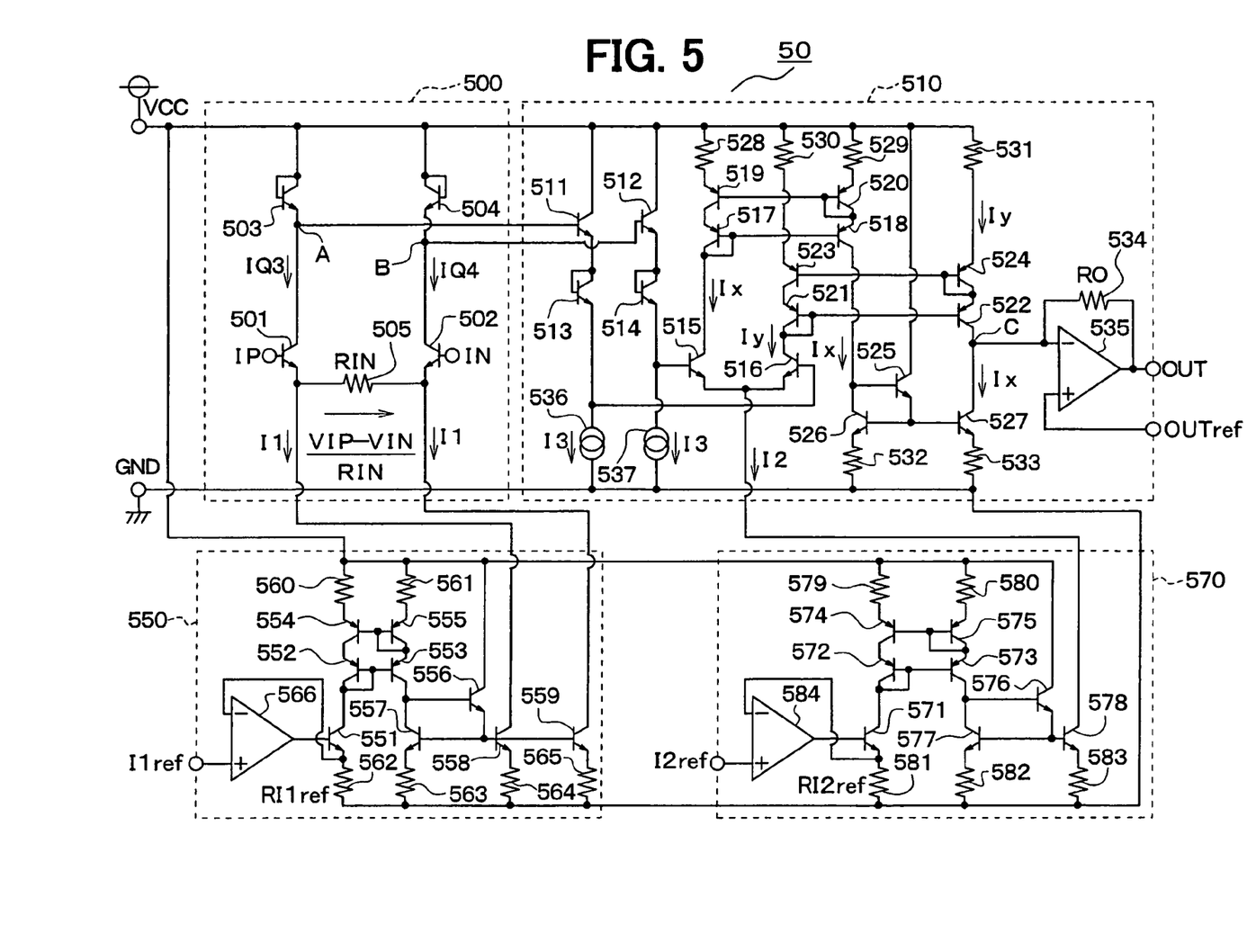
FIG. 5 is a circuit diagram of a variable gain unit in the first embodiment.

The variable gain unit 50 is shown in detail in FIG. 5. The variable gain unit 50 amplifies a voltage difference between the voltage VS outputted from the amplifier 20 and the voltage VSO outputted from the filter 30, with a gain that is inversely proportional to the output voltage VLSO of the level shifter 40. An input terminal IP is connected with an output terminal of the amplifier 20, and an input terminal I1ref is connected with the output terminal VLSO of the level shifter 40. A voltage VrefB from a constant voltage source 70 is applied to an input terminal I2ref, and a voltage VrefC from a constant voltage source 71 is applied to an input terminal OUTref.

The variable gain unit 50 includes a differential circuit 500, constant current generating circuits 550 and 570, and a differential amplifying circuit 510.

The differential circuit 500 includes an NPN-type transistor 501 with a control terminal (base terminal) applied with the output voltage VS of the amplifier 20 via the input terminal IP, an NPN-type transistor 502 with a control terminal (base terminal) applied with the output voltage VSO of the filter 30 via the input terminal IN, an input resistor 505 connected between the respective emitters of the transistors 501 and 502, an NPN-type transistor 503 connected in series with the NPN-type transistor 501, and an NPN-type transistor 504 connected in series with an NPN-type transistor 502.

The constant current generating circuit 550 includes a first current mirror circuit that comprises PNP-type transistors 554, 552, 555 and 553, and resistors 560 and 561, a second current mirror circuit that comprises NPN-type transistors 556 to 559 and resistors 563 to 565, an operational amplifier 556 and an NPN-type transistor 551 that function as buffers, and a resistor 562.

The voltage VLSO proportional to the atmospheric pressure shown by the equation 12 from the level shifter 40 is applied to the non-inverting input terminal of the operational amplifier 556, and a voltage proportional to the atmospheric pressure is outputted to the emitter of the transistor 551 via the output terminal of the operational amplifier 556. Currents I1 proportional to the atmospheric pressure respectively flow through the collectors of the transistors 558 and 559 by the first and the second current mirror circuits. I1 is expressed by the equation 12A.

$$I1 = K \times P0 / RI1ref \qquad \text{[Equation 12A]}$$

The collector of the transistor 558 of the constant current generating circuit 550 is connected with the emitter (first terminal) of the transistor 501 of the differential circuit 500, and the collector of the transistor 559 of the constant current generating circuit 550 is connected with the emitter (first terminal) of the transistor 502 of the differential circuit 500.

When a voltage VIP of the input terminal IP becomes higher than that of an input terminal VIN, a current (VIP−VIN)/RIN flows through the input resistor 505 in a direction indicated by the arrow in FIG. 5. RIN designates a resistance value of the input resistor 505.

A current IQ3 that flows from the collector to the emitter of the transistor 503, and a current IQ4 that flows from the collector to the emitter of the transistor 504 are expressed by equation 13.

$$IQ3 = I1 + (VIP - VIN)/RIN$$

$$IQ4 = I1 - (VIP - VIN)/RIN \qquad \text{[Equation 13]}$$

A potential VA at a connection point A of the transistors 501 and 503, and a potential VB at a connection point B of the transistors 501 and 503 are expressed by equation 14.

$$\begin{aligned}
VA &= VCC - (k \times T/q) \times \ln(IQ3/Is) \\
&= VCC - (k \times T/q) \times \ln[\{I1 + (VIP - VIN)/RIN\}/Is] \\
VB &= VCC - (k \times T/q) \times \ln(IQ4/Is) \\
&= VCC - (k \times T/q) \times \ln[\{I1 - (VIP - VIN)/RIN\}/Is]
\end{aligned} \qquad \text{[Equation 14]}$$

k is Boltzmann's constant; T, an absolute temperature; q, elementary electric charge; and Is, a reverse saturation current of the transistors 503 and 504.

The differential amplifying circuit 510 includes a level conversion circuit that comprises NPN-type transistors 511 to 514 and constant current sources 536 and 537. The constant current source 536 feeds a constant current I3 to the transistors 511 and 513 connected in series, and the constant current source 537 feeds a constant current I3 to the transistors 512 and 514 connected in series. When the respective forward drop voltages of the transistors 511 to 514 are VF, a voltage of the emitter of the transistor 513 is 2VFs lower than the voltage VA of the connection point A, and a voltage of the emitter of the transistor 514 is 2VFs lower than the voltage VB of the connection point VB. In this way, the level conversion circuit drops the respective voltages VA and VB of the connection points A and B using the forward drop voltage VF of the 5 transistors.

Therefore, when the respective forward drop voltages of the transistors 511 to 514 are VF, a base voltage VQ9 of the transistor 515 and a base voltage VQ10 of the transistor 516 are respectively expressed by equation 15.

$$VQ9=VCC-(k \times T/q) \times \ln(IQ4/Is)-2VF$$

$$VQ10=VCC-(k \times T/q) \times \ln(IQ3/Is)-2VF \quad \text{[Equation 15]}$$

The constant current generating circuit 570 includes a first current mirror circuit that comprises PNP-type transistor 574, 572, 575 and 573 and resistors 579 and 580, a second current mirror circuit that comprises NPN-type transistors 576 to 578 and resistors 582 and 583, an operational amplifier 584 and an NPN-type transistor 571 that function as buffers, and a resistor 581.

A voltage VrefB is applied to a non-inverting input terminal of the operational amplifier 584 from a constant voltage source 70 via a terminal I2ref, and a constant voltage VrefB is outputted to the emitter of the transistor 571 via an output terminal of the operational amplifier 584. A current I2 flows through the collector of the transistor 578 by the first and the second current mirror circuits. In this way, the constant current generating circuit 570 generates the constant current I2. I2 is expressed by equation 15A.

$$I2=VrefB/RI2ref \quad \text{[Equation 15A]}$$

The differential amplifying circuit 510 includes an NPN-type transistor 515 whose base is connected to the emitter of the transistor 514 of the level conversion circuit, an NPN-type transistor 516 whose base is connected to the emitter of the transistor 513 of the level conversion circuit, a first current mirror circuit that comprises PNP-type transistors 519, 517, 520 and 518 and resistors 528 and 529, a second current mirror circuit that comprises PNP-type transistors 523, 521, 524 and 522, and resistors 530 and 531, and a third current mirror circuit that comprises NPN-type transistors 525 to 527 and resistors 532 and 533.

The respective emitters of the transistors 515 and 516 are connected to each other, and the collector of the transistor 578 of the constant current generating circuit 570 is connected to a point in which they are connected. Therefore, when a current flowing through the transistor 515 is Ix, and a current flowing through the transistor 516 is Iy, a constant current I2 flowing through the transistor 578 is expressed by equation 16.

$$I2=Ix+Iy \quad \text{[Equation 16]}$$

As the current Ix increases, the current Iy decreases, while as the current Ix decreases, the current Iy increases. Since the current Ix and the current Iy are in a relation opposite to each other, when Ix-Iy=2×ΔI2, the currents Ix and Iy can be respectively expressed by equation 17.

$$Ix=I2/2+\Delta I2$$

$$Iy=I2/2-\Delta I2 \quad \text{[Equation 17]}$$

When the respective emitter voltages of the transistors 515 and 516 are VE, and the respective reverse saturation currents of the transistors 515 and 516 are Is', a relation of equation 18 is satisfied by the equation 15.

$$VCC-(k \times T/q) \times \ln(IQ4/Is)-2VF-VE=(k \times T/q) \times \ln(Ix/Is') \quad (1)$$

$$VCC-(k \times T/q) \times \ln(IQ3/Is)-2VF-VE=(k \times T/q) \times \ln(Iy/Is') \quad (2)$$

A relation shown by equation 19 is satisfied by (2)-(1) of the equation 18.

$$IQ4/IQ3=Iy/Ix \quad \text{[Equation 19]}$$

A relation of equation 20 is satisfied by the equations 13, 17 and 19.

$$\Delta I2=\{(VIP-VIN)/RIN\} \times (I2/I1)/2 \quad \text{[Equation 20]}$$

In FIG. 5, a current equal to 2×ΔI2, which is the difference between the current Ix and the current Iy, flows through a resistor 534 provided between an inverting input terminal and an output terminal of an operational amplifier 535. Since the voltage VrefC is applied to the non-inverting input terminal of the operational amplifier 535 from the constant voltage source 71 via the input terminal OUTref, a voltage VOUT outputted from the output terminal OUT of the operational amplifier 535 is expressed by equation 21.

$$\begin{aligned} VOUT &= (Ix-Iy) \times RO + VOUTref \quad \text{[Equation 21]} \\ &= (RO/RIN) \times (I2/I1) \times \\ &\quad (VIP-VIN) + VrefC \end{aligned}$$

In this embodiment, the resistance value RIN of the input resistance 505, a resistance value RO of the resistor 534, and the current I2 are constant, and the current I1 is proportional to the atmospheric pressure P0. A voltage difference between the input terminal IP and the input terminal IN is proportional to a pressure change ΔP from the atmospheric pressure.

Therefore, the output voltage VOUT of the variable gain unit 50 is inversely proportional to the atmospheric pressure P0 and proportional to a pressure change ΔP from the atmospheric pressure. Specifically, the output voltage VOUT of the variable gain unit 50 has a property proportional to ΔP/P0. By this characteristic, even if the pressure change ΔP changes as the atmospheric pressure changes, since a ratio ΔP/P0 of the pressure change ΔP to the atmospheric pressure P0 is constant, the influence of the atmospheric pressure P0 can be avoided.

An output voltage of the variable gain unit 50 is inputted to the determination circuit 60 as shown in FIG. 1. The determination circuit 60 comprises a comparator (not shown). For example, when the output voltage VOUT of the variable gain unit 50 is more than a preset voltage, the determination circuit 60 outputs a signal of a high level. When the output voltage VOUT of the variable gain unit 50 is less than the preset voltage, the determination circuit 60 outputs a signal of a low level and determines the presence or absence of collision against a vehicle door.

According to the first embodiment, the variable gain unit 50 amplifies a voltage difference between a voltage including a voltage component corresponding to the atmospheric pressure P0 and a voltage component corresponding to a change quantity ΔP from the atmospheric pressure P0, and a voltage including a voltage component corresponding to the atmospheric pressure P0 outputted from the filter 30, with a gain that is inversely proportional to a voltage including a voltage component corresponding to the atmospheric pressure P0 outputted from the filter 30. Specifically, since a voltage outputted from the variable gain unit 50 is proportional to the ratio ΔP/P0 of pressure change ΔP to the atmospheric pressure P0, it is not influenced by the change quantity ΔP from the atmospheric pressure P0 due to a change in the atmospheric pressure P0. Therefore, detection precision of collision can be increased.

Atmospheric pressure in this embodiment can be considered as an average physical quantity of a detection target, and a pressure change from atmospheric pressure as a change quantity from an average physical quantity. Specifically, a signal representing a ratio of a change quantity from an average physical quantity to an average physical quantity of a detection target is outputted from the variable gain unit 50 to avoid the influence of the average physical quantity of the detection target.

Since this physical quantity detector comprises only analog circuits, size reduction can be attained by integration.

As described later, a ratio of a change quantity from an average physical quantity to an average physical quantity of a detection target can be calculated by digital processing. However, calculation by digital processing may prolong detection time from a change of a physical quantity to signal output due to a delay by the calculation. Since the physical quantity detector in this embodiment comprises only analog circuits, detection time can be reduced. Specifically, when this physical quantity detector is applied to a side collision detector that detects collision against a vehicle door by detecting a pressure change within the vehicle door, detection time of collision can be reduced. When an airbag is activated according to collision detection by the side collision detector, the air bag can be activated in a short time from the collision.

Second Embodiment

Figure 6:
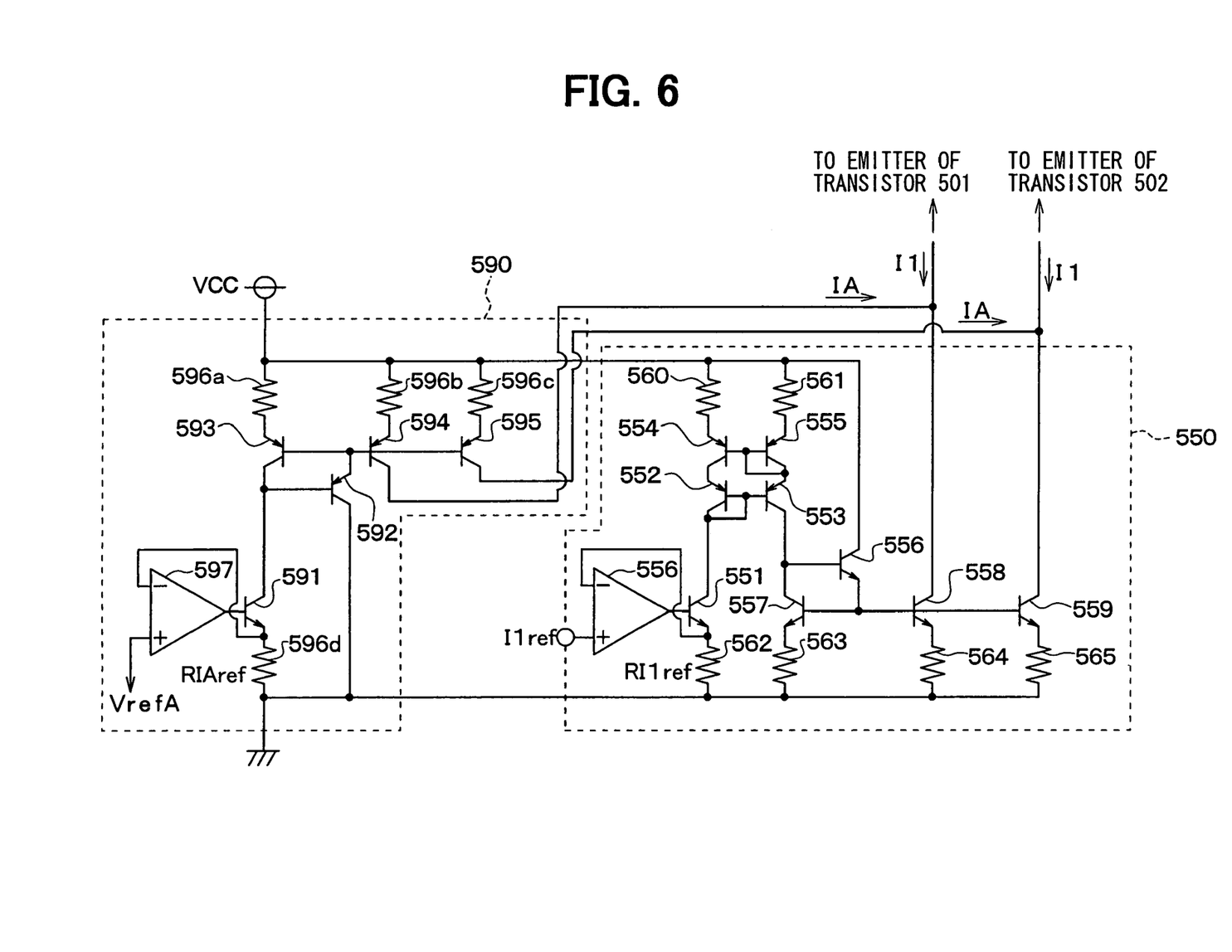
FIG. 6 is a circuit diagram of a level shifter and a constant current generating circuit of a physical quantity detector according to a second embodiment of the present invention.

According to a second embodiment, a level shifter 590 of the physical quantity detector and a constant current generating circuit 550 are constructed as shown in FIG. 6. In the first embodiment, the level shifter 40 is provided between the input terminals IN and I1ref of the variable gain unit 50 as shown in FIG. 1. IN this embodiment, the level shifter 590 is incorporated in the variable gain unit 50. The constant current generating circuit 550 is constructed as in the first embodiment as shown in FIG. 5. The input terminal I1ref of the variable gain unit 50 in this embodiment is connected with the output terminal VLPFO of the filter 30.

The level shifter 590 includes a current mirror circuit that comprises PNP-type transistors 592 to 595 and resistors 596a, 596b and 596c, an operational amplifier 597 and an NPN-type transistor 591 that function as buffers, and a resistor 596d.

A reference voltage VrefA generated by a reference potential generating circuit (not shown) is applied to a non-inverting input terminal of the operational amplifier 597. An equal current IA flows through each of the transistors 594 and 595 by the current mirror circuit. When a resistance value of the resistor 596d is RIAref, the current IA flowing through the transistors 594 and 595 is expressed by equation 22.

$$IA = VrefA/RIAref \quad \text{[Equation 22]}$$

Since the voltage VS0 expressed by the equation 8 is applied to the terminal I1ref of the variable gain unit 50 of this embodiment, when a resistance value of the resistor 562 is RI1ref, a relation of equation 23 is satisfied.

$$I1 = (K \times P0 + VrefA)/RI1ref - IA \quad \text{[Equation 23]}$$
$$= K \times P0/RI1ref + VrefA/RI1ref -$$
$$VrefA/RIAref$$

The resistance value RIAref of the resistor 596d and the RI1ref of the resistor 562 are equal. Therefore, when RIAref=RI1ref, a constant current I1 is expressed by equation 24.

$$I1 = K \times P0/RI1ref \quad \text{[Equation 24]}$$

In this way, the constant current I1 proportional to the atmospheric pressure P0 can be generated.

Other Embodiments

Figure 7A:
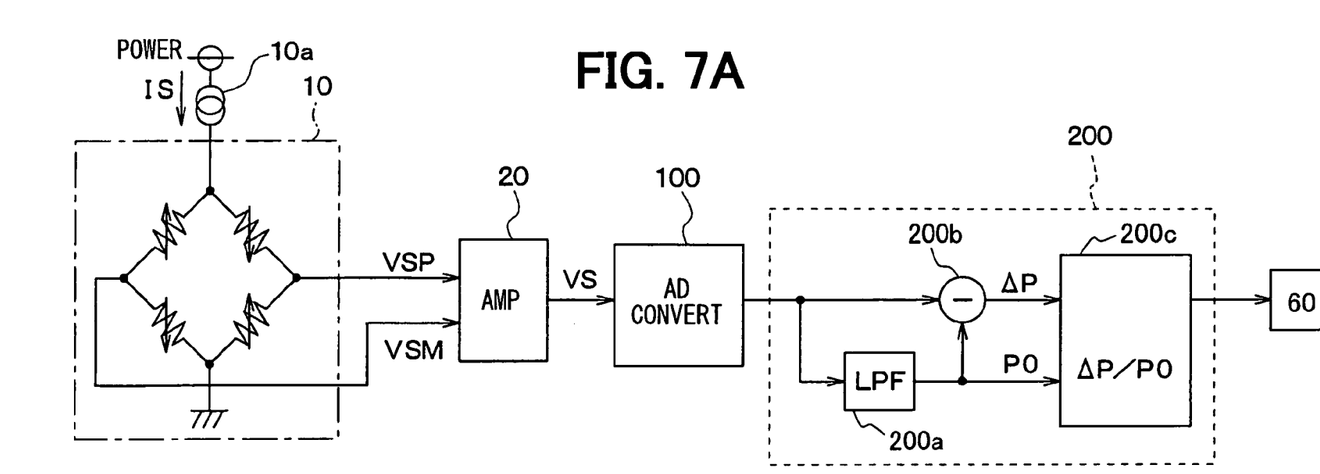
FIGS. 7A and 7B are circuit diagrams of variations of other embodiments of the present invention.
Figure 7B:
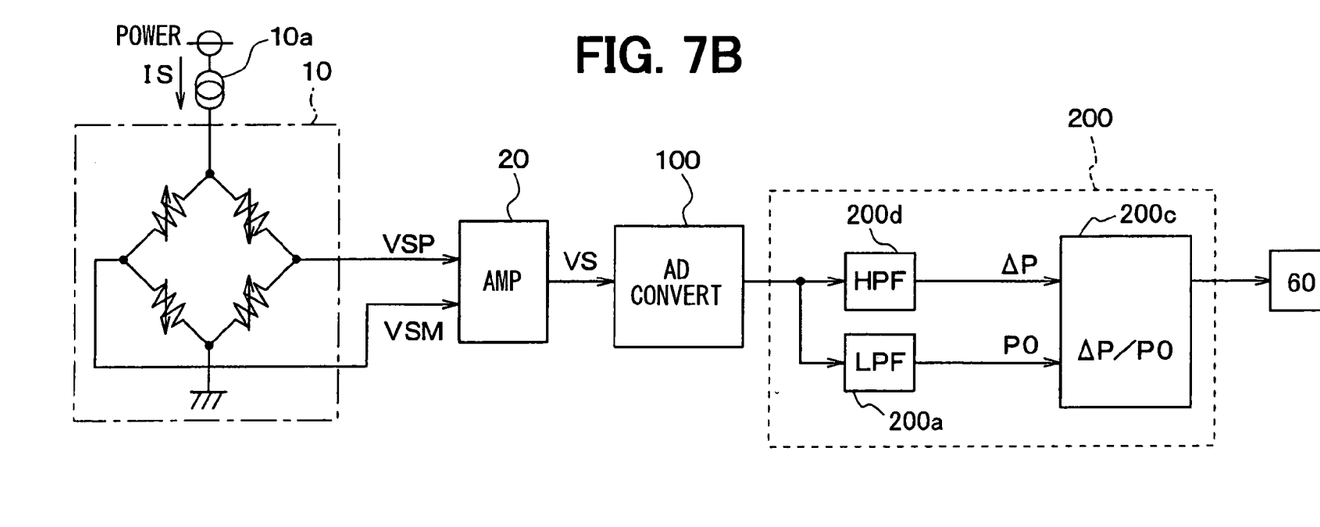

Although the physical quantity detector is constructed with only analog circuits in the above embodiments, the physical quantity detector may include an AD conversion circuit 100 and a microcomputer 200 or the like as shown in FIGS. 7A and 7B. The circuit 100 converts a voltage VS outputted from the amplifier 20 into a digital signal. The microcomputer 200 digitally calculates a pressure change ΔP/P0 based on the signal converted into the digital signal by the AD conversion circuit 100. In this case, as shown in FIG. 7A, in a low pass filtering process (LPF) 200a by digital signal processing of the microcomputer 200, P0 which is free from a component corresponding to a change ΔP from the output signal from the AD conversion circuit 100 is produced. The change ΔP is produced by a subtracting process 200b, which subtracts P0 from the output signal from the AD conversion circuit 100, and a ratio ΔP/P0 is calculated by a calculation process 200c. Alternatively, as shown in FIG. 7B, in a low pass filtering process (LPF) 200a by digital signal processing of the microcomputer 200, P0 which is free from ΔP is produced. A change ΔP with P0 eliminated from the output signal from the AD conversion circuit 100 is produced by a high pass filtering process (HPF) 200d by digital signal processing of the microcomputer 200, and a ratio ΔP/P0 is calculated by the calculation process 200c.

Although, an example of application of the physical quantity detector to a side collision detector that detects collision against a vehicle door by detecting a pressure change within a vehicle door is shown, the physical quantity detector is not limited to such a usage. For example, it may be applied to a device that detects changes in oil pressure and water pressure.

Although, the output of the filter 30 is dropped by the reference voltage of the amplifier 20 by the level shifter 40 including the operational amplifier 415, the present invention is not limited to such a construction.

Still further modifications and alterations are possible without departing from the spirit of the invention.

What is claimed is:

1. A physical quantity detector comprising:
   a detecting means that outputs a detection output voltage including a voltage component corresponding to an average physical quantity of a detection target and a voltage component corresponding to a change quantity from the average physical quantity;
   a filter means that eliminates the voltage component corresponding to the change quantity from the detection output voltage and outputs a filter output voltage including the voltage component corresponding to the average physical quantity; and
   a variable gain unit that amplifies a voltage difference between the detection output voltage and the filter output voltage, with a gain that is inversely proportional to the filter output voltage.

2. The physical quantity detector according to claim 1, wherein the variable gain unit includes:
   a first transistor that has a control terminal applied with the detection output voltage;

a second transistor that has a control terminal applied with the filter output voltage;

a constant current generating circuit that generates two constant currents proportional to the filter output voltage, and feeds the constant currents to the first transistor and the second transistor, respectively;

an input resistor connected between a first terminal of the first transistor connected with the constant current generating circuit and a first terminal of the second transistor connected with the constant current generating circuit;

wherein the first transistor has a second terminal that outputs a voltage corresponding to a sum of the constant current generated by the constant generating circuit and a current flowing through the input resistor, and the second transistor has a second terminal that outputs a voltage corresponding to a difference between the constant current generated by the constant current generating circuit and the current flowing through the input resistor, and a differential amplifying circuit that outputs a voltage corresponding to a voltage difference between the voltage outputted from the second terminal of the first transistor and the voltage outputted from the second terminal of the second transistor.

3. The physical quantity detector according to claim 1, wherein:

the detecting means includes an amplifier that amplifies the detection output voltage, and outputs an amplifier output voltage by adding a reference voltage to an amplified detection output voltage; and the constant current generating circuit includes a potential dropping means that drops the filter output voltage by the reference voltage of the amplifier, and generates the constant currents proportional to the average physical quantity of the detection target.

* * * * *